United States Patent
Koshkin et al.

(10) Patent No.: US 10,228,925 B2
(45) Date of Patent: Mar. 12, 2019

(54) SYSTEMS, DEVICES, AND METHODS FOR DEPLOYING ONE OR MORE ARTIFACTS TO A DEPLOYMENT ENVIRONMENT

(71) Applicant: Uptake Technologies, Inc., Chicago, IL (US)

(72) Inventors: Yuriy Koshkin, Arlington Heights, IL (US); Will Hansmann, River Forest, IL (US); Ben Heilman, Chicago, IL (US); Colleen Stock, Chicago, IL (US); Tod Johnson, Volo, IL (US); Andrei Zernoveanu, Chicago, IL (US)

(73) Assignee: Uptake Technologies, Inc., Chicagao, IL (US)

( * ) Notice: Subject to any disclaimer, the term of this patent is extended or adjusted under 35 U.S.C. 154(b) by 74 days.

(21) Appl. No.: 15/384,171

(22) Filed: Dec. 19, 2016

(65) Prior Publication Data

US 2018/0173510 A1    Jun. 21, 2018

(51) Int. Cl.
G06F 8/60 (2018.01)
G06Q 10/06 (2012.01)
G06F 8/71 (2018.01)

(52) U.S. Cl.
CPC .......... *G06F 8/60* (2013.01); *G06F 8/71* (2013.01); *G06Q 10/06313* (2013.01); *Y04S 10/54* (2013.01)

(58) Field of Classification Search
CPC . G06F 8/60; G06F 11/30; G06F 9/445; G06F 9/44; G06F 9/455; G06F 9/50; G06Q 10/06313
(Continued)

(56) References Cited

U.S. PATENT DOCUMENTS 5,566,092 A   10/1996   Wang et al.
5,633,800 A    5/1997   Bankert et al.
(Continued)

FOREIGN PATENT DOCUMENTS

WO    2011117570         9/2011
WO    2012142310 A1    10/2012
(Continued)

OTHER PUBLICATIONS

Hossny et al., "A Case Study for Deploying Applications on Heterogeneous PaaS Platforms", 2014, IEEE (Year: 2014).*
(Continued)

*Primary Examiner* — Wei Y Zhen
*Assistant Examiner* — Junchun Wu
(74) *Attorney, Agent, or Firm* — Lee Sullivan Shea & Smith LLP

(57) ABSTRACT

A deployment system includes a plurality of deployment environments, a change-control server, and a deployment orchestrator. Each deployment environment carries out a given phase of a deployment process for a set of artifacts. The change-control server maintains branches that correspond to respective deployment environments and that store artifacts that have been deployed to the respective deployment environments. A manifest contains a given set of artifacts stored by the change-control server, and each branch may contain multiple versions of a manifest associated with that branch. Upon creation of a new manifest version on the change-control server, the deployment orchestrator detects the presence of the new manifest version and responsively determine the differences between (i) artifacts contained in the new manifest version and (ii) artifacts deployed to a given deployment environment. Based on the determined differences, the deployment orchestrator causes
(Continued)

one or more artifacts to be deployed to the given deployment environment.

20 Claims, 6 Drawing Sheets

(58) Field of Classification Search
USPC .......................................................... 717/101
See application file for complete search history.

(56) References Cited

U.S. PATENT DOCUMENTS

| | | | |
|---|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,719,782 B2 | 5/2014 | DeHaan |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,058,330 B2* | 6/2015 | Kimmet | G06F 11/3003 |
| 9,405,523 B2* | 8/2016 | Choi | G06F 8/71 |
| 9,600,269 B1* | 3/2017 | Bregler | G06F 8/60 |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2003/0182652 A1 | 9/2003 | Custodio |
| 2004/0034850 A1* | 2/2004 | Burkhardt | G06F 8/65 |
| | | | 717/120 |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2006/0015840 A1 | 1/2006 | Marvel et al. |
| 2007/0250574 A1* | 10/2007 | Tseitlin | G06F 8/61 |
| | | | 709/205 |
| 2007/0263628 A1 | 11/2007 | Axelsson et al. |
| 2008/0046858 A1* | 2/2008 | McClean | G06F 8/71 |
| | | | 717/100 |
| 2008/0059080 A1 | 3/2008 | Greiner et al. |
| 2008/0059120 A1 | 3/2008 | Xiao et al. |
| 2009/0276769 A1* | 11/2009 | Brannen, Jr. | G06F 8/61 |
| | | | 717/174 |
| 2011/0307862 A1* | 12/2011 | Abrams | G06F 8/71 |
| | | | 717/120 |
| 2012/0227030 A1 | 9/2012 | Radez |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0139126 A1* | 5/2013 | Archer | G06F 9/44505 |
| | | | 717/121 |
| 2013/0232498 A1 | 9/2013 | Komal et al. |
| 2013/0283773 A1 | 10/2013 | Hague |
| 2013/0325502 A1 | 12/2013 | Robicsek et al. |
| 2013/0332916 A1* | 12/2013 | Chinn | G06F 8/65 |
| | | | 717/169 |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0109082 A1* | 4/2014 | Kimmet | G06F 11/3003 |
| | | | 717/176 |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0189641 A1 | 7/2014 | Anderson et al. |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |

(56) References Cited

U.S. PATENT DOCUMENTS

| | | | |
|---|---|---|---|
| 2014/0358601 A1 | 12/2014 | Smiley et al. | |
| 2015/0025925 A1* | 1/2015 | Moore | G06Q 10/063 705/7.11 |
| 2015/0046870 A1 | 2/2015 | Goldenberg et al. | |
| 2015/0082291 A1 | 3/2015 | Thomas et al. | |
| 2015/0113504 A1* | 4/2015 | Artzi | G06F 8/60 717/120 |
| 2015/0220308 A1* | 8/2015 | Condon | G06F 8/20 717/104 |
| 2015/0262060 A1 | 9/2015 | Husain et al. | |
| 2015/0301824 A1 | 10/2015 | Patton et al. | |
| 2016/0021197 A1* | 1/2016 | Pogrebinsky | H04L 67/16 709/226 |
| 2016/0239280 A1* | 8/2016 | Scheiner | G06F 8/60 |
| 2016/0239281 A1* | 8/2016 | Avisror | G06F 8/61 |
| 2016/0378449 A1* | 12/2016 | Khazanchi | G06F 8/71 717/120 |
| 2017/0060557 A1* | 3/2017 | Bendelac | G06F 8/60 |
| 2017/0262266 A1* | 9/2017 | Bendelac | G06F 8/60 |

FOREIGN PATENT DOCUMENTS

| | | |
|---|---|---|
| WO | 2013034420 | 3/2013 |
| WO | 2014145977 | 9/2014 |
| WO | 2014205497 | 12/2014 |

OTHER PUBLICATIONS

White et al., "An Integrated Experimental Environment for Distributed Systems and Networks", 2002, University of Utah (Year: 2002).*

Valckenaers et al., "Applications and environments for multi-agent systems", Aug. 2006, Springer (Year: 2006).*

Huemer et al., "Inter-organizational Systems: From Business Values over Business Processes to Deployment", 2008, IEEE (Year: 2008).*

Kleine et al. "An Abstraction for Version Control Systems." Technische Berichte des Hasso-Plattner-Instituts für Softwaresystemtechnik an der Universität Potsdam 2012, 88 pages.

Miguel. "Plastic meets Docker." Plastic SCM. blog.plasticscm.com/search/label/docker, Jan. 22, 2015, 8 pages.

Dreller, Johannes. "Git & GitHub for Front-End Developers." 4digits.net/blog/git-github/, Aug. 21, 2014, 10 pages.

Riley, Chris. "DevOps is Crippled Without Continuous Integration." Gigaom Research, Feb. 2, 2015, 18 pages.

"A Containerized Testing Strategy: Docker's Impact on QA and Application Quality." SauceLabs Mar. 2016, 12 pages.

Dangi, Sanket. "5 Key Benefits of Docker: CI, Version Control, Portability, Isolation and Security." IOD Community, Apr. 24, 2015, 4 pages.

Biswas, "Redundancy-based Approaches in Wireless Multihop Network Design", PhD Dissertation Submitted to Graduate Faculty of North Carolina State University (2014).

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan. 2012).

International Searching Authority, International Search Report and Written Opinion dated Apr. 13, 2018, issued in connection with International Application No. PCT/US2017/066900, filed on Dec. 17, 2017, 8 pages.

* cited by examiner

SYSTEMS, DEVICES, AND METHODS FOR DEPLOYING ONE OR MORE ARTIFACTS TO A DEPLOYMENT ENVIRONMENT

BACKGROUND

The development and deployment of software has become increasingly complex as new technologies have emerged. In general, the process of developing and deploying software involves many different activities that may be categorized into phases. As one representative example, a given deployment process may include a development phase where the software is initially developed, a testing and/or quality assurance (QA) phase where software is initially tested, a staging phase where the software is tested in its final form before production, and a production phase where the software is actually provided to end users. Other examples are possible as well.

Each phase of a software deployment process is typically carried out in a different environment, which may comprise a computer system that includes or more computing systems. For example, a development phase may be carried out in a development environment, a testing and/or QA phase may be carried out in a testing/QA environment, a staging phase may be carried out in a staging environment, and a production phase may be carried out in a production environment. As each phase is completed, the software is typically deployed to a new environment where the next phase can be carried out. In practice, these different deployment environments vary in scale, with the scale increasing from the development environment to the production environment. For example, a development environment may comprise one or more developer's workstations and perhaps a server computer, whereas a production environment may comprise many different server computers that are networked together.

As the process of developing and deploying software becomes more complex, there is a growing need for an improved system that facilitates this process.

OVERVIEW

Disclosed herein are improved methods and systems for deployment of software that takes the form of a set of artifacts, where each artifact generally comprises an executable file for a given version of a given application or service within a platform. An artifact could take various forms, examples of which may include a Docker container, a Java ARchive (JAR) file, a Web application ARchive (WAR) file, an Apache Spark executable, and/or a Chef script, among many others. An artifact may take other forms as well.

In accordance with the present disclosure, a deployment system may include a plurality of deployment environments, a change-control server, and a deployment orchestrator. In line with the discussion above, each of the deployment environments may be a computer system configured to carry out a given phase of the deployment process for a set of artifacts, such as development, testing, QA, staging, or production as examples. In turn, the change-control server may generally be configured to maintain and facilitate the deployment of artifacts.

The change-control server disclosed herein may maintain different branches, each of which corresponds to a given environment and stores artifacts for deployment in that given environment. For instance, the change-control server may maintain a first branch that corresponds to first deployment environment (e.g., development) and stores artifacts for deployment in that first deployment environment, a second branch that corresponds to second deployment environment (e.g., testing and/or QA) and stores artifacts for deployment in that second deployment environment, and so on. Each such branch may then effectively serve as a timeline of the artifacts that have been deployed in a given deployment environment, and thereby reflect the changes that have been made to artifacts deployed in the given deployment environment over time. For instance, if a developer creates a new artifact that comprises a new version of a given application/service, the change-control server may update the development branch with the new artifact for the given application/service.

Additionally, the change-control server may also use the branches to facilitate the promotion of artifacts from one deployment environment to another. For instance, each branch may be associated with permissions that define which users can access the branch's corresponding deployment environment and/or grant promotions to that branch/environment. In accordance with these permissions, a first user that is authorized to access a first branch/deployment environment may request promotion of an artifact from the first deployment branch/environment to a second branch/deployment environment, and a second user that is authorized to grant promotions to the second branch/environment may then decide to grant the requested promotion, which may lead to the artifact being merged into the second branch.

In accordance with the present disclosure, the change-control server may use a manifest to facilitate the process of tracking changes to artifacts on a given branch and deploying artifacts to a deployment environment. In general, a given manifest may be a data structure that comprises a given set of related artifacts, such as artifacts for a related set of applications/services within the platform, along with other associated data that may be used for tracking and deploying the set of artifacts. This associated information may take various forms, examples of which may include metadata for the given set of artifacts (e.g., an identifier for each artifact in the manifest such as a name, version number, etc.), environment data for each deployment environment that facilitates access to the environment (e.g., one or more database Uniform Resource Locators (URLs), Application Programming Interface (API) URLs, usernames, passwords, etc.), and artifact-deployment data for the given set of artifacts that enables an environment to deploy the artifacts (e.g., URLs, API URLs, lists of deployment environments to which a given artifact can and cannot be deployed, etc.).

In practice, the change-control server may create a new version of a manifest on a given branch each time there is an update to the given set of related artifacts contained in that manifest (e.g., an artifact for a new version of an application/service is created), and the change-control server may then maintain both the prior version of the manifest and the new version of the manifest on the given branch. In this respect, the change-control server may also maintain (or be capable of generating) information that reflects the changes between two versions of a manifest. This change information could be included as part of the manifest itself or could be stored separately.

Additionally, the change-control server may also use the manifests to promote artifacts between environments. For instance, a first user that is authorized to access a first branch/deployment environment may request promotion of a given manifest (as opposed to individual artifacts) from the first deployment branch/environment to a second branch/deployment environment, which may lead to the manifest being merged into the second branch.

The deployment system may then include a deployment orchestrator that is configured to deploy artifacts to the deployment environments based on these manifests. In general, the deployment orchestrator may function to (1) check the most-recently updated manifest on a given branch corresponding to a given deployment environment, (2) determine whether the manifest includes any artifact that differs from the artifacts running at the given deployment environment, and (3) if so, cause any such artifact to be deployed to the given deployment environment. The deployment orchestrator may perform these functions in various manners.

According to one example embodiment, the deployment orchestrator may periodically query the change-control server to determine whether there is an updated manifest on any of the branches (e.g., a manifest that contains one or more updated artifacts). If the deployment orchestrator identifies an updated manifest on a given branch, it may then identify which artifact(s) in the updated manifest are not already running on the given branch's corresponding environment and cause the identified artifact(s) to be deployed to the environment. In one implementation, for instance, the deployment orchestrator may obtain a copy of the identified artifact(s) along with certain associated data for deploying the artifact(s), such as environment and artifact-deployment data, from the change-control server. In turn, the deployment orchestrator may provide the identified artifact(s) to the environment for deployment. As part of this process, the deployment orchestrator may use the environment data to configure the artifact(s) for deployment to the specific environment, and the environment may then use the artifact-deployment data to deploy the specific artifact(s). Several implementations are possible as well.

Additionally, the deployment orchestrator may cause the environment to "undeploy" any artifact(s) that were previously deployed but that are not stored within the updated manifest (e.g., if one or more artifacts have been removed from the updated version of the manifest as compared to the prior version of the manifest). In this manner, the deployment orchestrator may ensure that the artifacts deployed to the environment are those artifacts that are stored in the most-recent manifest version.

Accordingly, in one aspect, disclosed herein is a method that involves (a) monitoring a change-control server for an updated manifest, wherein the change-control server comprises a plurality of branches for storing manifests, (b) detecting an updated manifest on a given branch corresponding to a given deployment environment among a plurality of deployment environments, wherein each branch of the change-control server corresponds to a respective deployment environment among the plurality of deployment environments, wherein detecting the updated manifest comprises identifying at least one artifact that differs between (i) a first set of artifacts contained in the updated manifest and (ii) a second set of artifacts being deployed at the given deployment environment; and (c) causing the identified at least one artifact to be deployed to the given deployment environment. In practice, the method may be carried out by a deployment orchestrator.

In another aspect, disclosed herein is a computer system that includes (a) a network interface configured to facilitate communications over a communication network with (i) a plurality of deployment environments and (ii) a change-control server comprising a plurality of branches for storing manifests, wherein each branch corresponds to a respective deployment environment, (b) at least one processor, (c) a non-transitory computer-readable medium, and (d) program instructions stored on the non-transitory computer-readable medium that are executable by the at least one processor to cause the computing system to carry out the functions disclosed herein for facilitating deployment of artifacts.

In yet another aspect, disclosed herein is a non-transitory computer-readable medium having program instructions stored thereon that are executable to cause a computing device to carry out the functions disclosed herein for facilitating deployment of artifacts.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Deployment System

Figure 1:
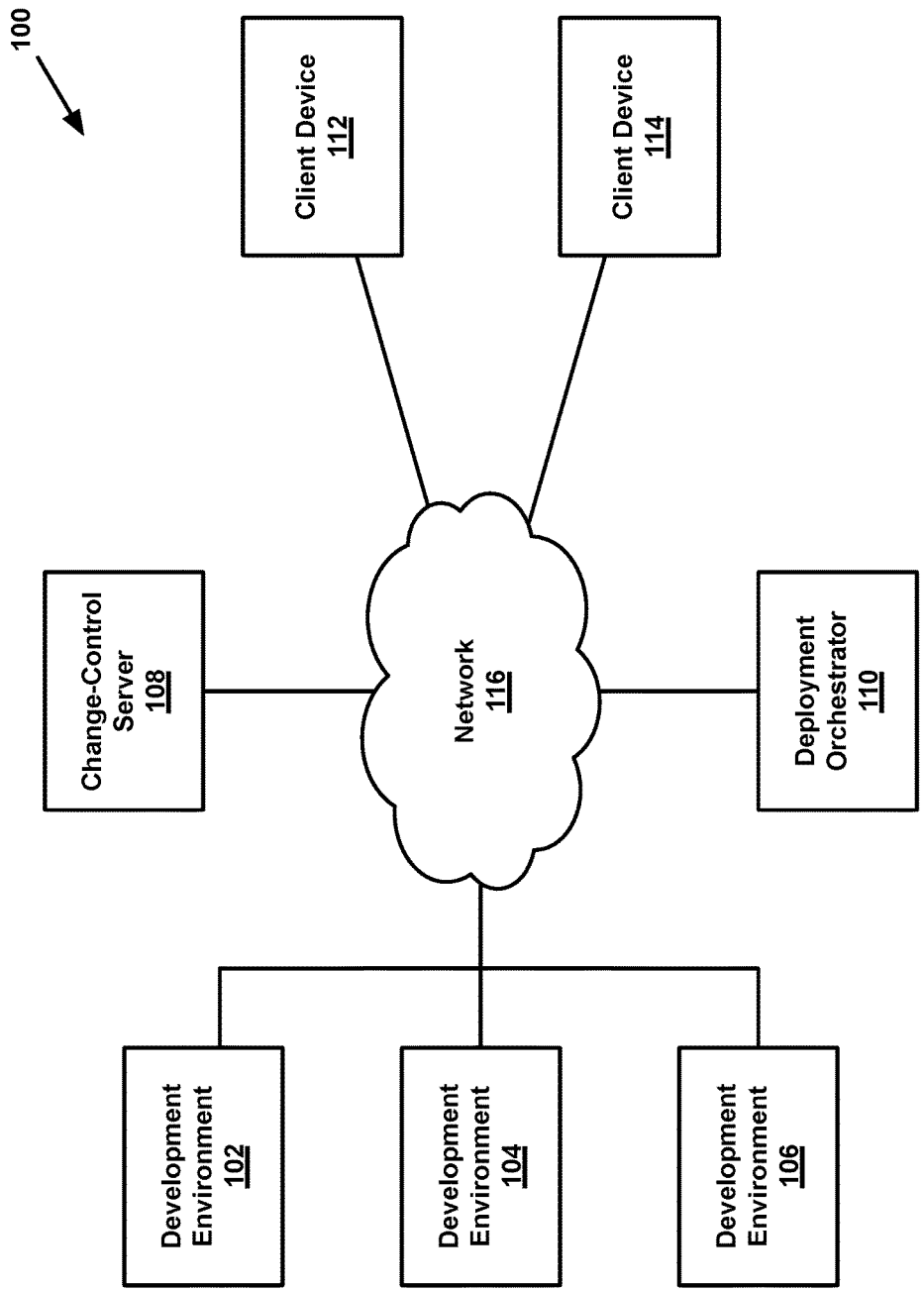
FIG. 1 depicts an example of a deployment system.

FIG. 1 depicts an example of a deployment system, in accordance with at least one embodiment. As shown, a deployment system 100 includes one or more deployment environments 102, 104, and 106, a change-control server 108, a deployment orchestrator 110, client devices 112 and 114, and a network 116 that collectively facilitate the deployment of one or more artifacts at respective deployment phases.

Each deployment environment 102, 104, and 106 may take the form of one or more computing systems configured to execute one or more software programs. An example of such a software program is an application or service that functions to receive, manage, analyze, and/or share data related to one or more assets such as transportation machines (e.g., locomotives, aircrafts, semi-trailer trucks, ships, etc.), industrial machines (e.g., mining equipment, construction equipment, etc.), medical machines (e.g., medical imaging equipment, surgical equipment, medical monitoring systems, medical laboratory equipment, etc.), and/or utility machines (e.g., turbines, solar farms, etc.), among other examples. A given software program could provide an interface via which one or more computing systems (such as client devices 112 and 114) and/or users of such systems may interact with the software program, perhaps via network 116. Other software programs could take other forms and may provide different functionality.

The process of developing and deploying a given software program may be categorized into one or more phases involving various activities at each phase. Examples of phases include a development phase in which a software program in initially developed, a testing and/or quality assurance (QA) phase in which the software program is initially tested, a staging phase in which the software program is tested in its final form before production, and a production phase in which the software program is provided to end users. Those of skill in the art will appreciate that different and/or additional phases are possible as well.

These deployment phases may occur in order such that, when a given phase is completed, deployment of the software program progresses to the next stage. For example, the development phase may precede the testing phase such that, when the development phase of the software program is completed, the program to the testing phase. The deployment process may later continue on to the staging phase and later to the production stage. The described order of phases is just one example in which the deployment process may progress.

Each deployment environment 102, 104, and 106 (including the computing systems of the respective environments) may be suitable for a given phase of the deployment process, and the given phase may be carried out using the respective deployment environment for that phase. For example, a development phase may be carried out using a development environment, a testing and/or QA phase may be carried out using a testing/QA environment, and so forth. The configuration of the computer systems that make up these deployment environments may also vary. For instance, a development environment may comprise a computing system that includes a single developer workstation and/or a single server computer, while a production environment may comprise multiple server computers that are networked in a cloud environment, as examples.

The data accessible to a given deployment environment may depend on the phase of the deployment for which the deployment environment is used. For example, each deployment environment may have its own database that contains data specific to the particular phase for the respective deployment environment. The databases could also store other types of environment resources specific to the respective deployment environments.

The respective computing systems of deployment environment 102, 104, and 106 may include one or more computing systems having hardware and software for executing one or more software programs. An example computing system is described below with reference to FIG. 2, but in general, a given computing system in a deployment environment may include a CPU, memory, and data storage that collectively allow the computing system run an operating system, hypervisor, application server, Java Virtual Machine (JVM), or the like to facilitate execution of a software program. The computing systems and/or computing system may be located in a single physical location or distributed amongst a plurality of locations, and may be communicatively linked via a system bus, a communication network (e.g., a private network), or some other connection mechanism.

In some implementations, one or more of the deployment environments 102, 104, and 106 may include a resource manager that provides, to artifacts executing in the deployment environment, a layer of abstraction of (physical or virtual) computing-system resources (such as CPUs, memory, and/or data storage). The resource manager may distribute use of such resources across multiple computing systems in the deployment environment. For example, if an executing artifact attempts to save temporary data to an abstract data-storage device, the resource manager may function to distribute various parts of the temporary data to multiple storage devices. When the executing artifact subsequently attempts to retrieve the temporary data from the abstract data-storage device, the resource manager may retrieve the temporary-data parts from the various storage devices and provide the re-assembled temporary data to the executing artifact. Example resource managers include Apache Mesos and Apache Hadoop NextGen MapReduce.

Further, in some implementations, one or more of the deployment environments 102, 104, and 106 may be individually scalable. For example, deployment environment 102 may be configured to scale in accordance with a first set of parameters, deployment environment 104 may be configured to scale in accordance with a second set of parameters, and deployment environment 106 may be configured to scale in accordance with a third set of parameters, where these parameters may differ. This ability to scale different deployment environments individually may avoid the need to run all deployment environments at the same scale as the production environment, which may be costly. Various different entities may maintain the scaling parameters for the different deployment environments in the deployment system 100, including the deployment environments themselves, the change-control server 108, etc.

In accordance with the present disclosure, the software programs to be deployed and executed at deployment environments 102, 104, and 106 may take the form of artifacts, where each artifact generally comprises an executable file for the given software program. In other words, an artifact may either already be compiled, or a may be in a form that does not require compilation, such that a deployment environment need not compile the artifact before execution. An artifact could take various forms, examples of which may include a Docker container, a Java ARchive (JAR) file, a Web application ARchive (WAR) file, an Apache Spark executable, and/or a Chef script. An artifact may take other forms as well.

In general, change-control server 108 may take the form of one or more computer systems, which may in turn comprise hardware components and software components that are configured to store and maintain and facilitate the deployment of one or more artifacts, among other functions disclosed herein. Similar to the computing systems of deployment environments 102, 104, and 106, the computing systems of change-control server 108 may be located in a single location or multiple locations, and may be communicatively linked via a system bus, communication network, other connection mechanism. The change-control server may store the artifacts in a computer storage (such as a hard-disk drive or solid-stage drive), a database, a network-attached storage, a storage area network, or other data storage capable of storing such artifacts.

In accordance with the present disclosure, change-control server 108 may maintain different branches, each of which corresponds to a given environment and stores artifacts to be deployed in that given environment. For instance, the change-control server may maintain a first branch that corresponds to deployment environment 102 and stores artifacts deployment in deployment environment 102, a second branch that corresponds to deployment environment 104 and stores artifacts for deployment in deployment environment 104, and so on. Each such branch may then effectively serve as a timeline of the artifacts that have been deployed in a given deployment environment, and thereby reflect the changes that have been made to artifacts deployed in the given deployment environment over time. For instance, if a developer using one of client devices 112, 114 creates a new artifact that comprises a new version of a given application/service, the change-control server 108 may update the development branch with the new artifact for the given application/service.

Additionally, the change-control server 108 may also use the branches to facilitate the promotion of artifacts from one deployment environment to another. For instance, each branch may be associated with permissions that define which users can access the branch's corresponding deployment environment and/or grant promotions to that branch/environment. In accordance with these permissions, a first user that is authorized to access a first branch/deployment environment may request promotion of an artifact from the first deployment branch/environment to a second branch/deployment environment, and a second user that is authorized to grant promotions to the second branch/environment may then decide to grant the requested promotion, which may lead to the artifact being merged into the second branch.

In accordance with the present disclosure, change-control server 108 may use a manifest to facilitate the process of tracking changes to artifacts on a given branch and deploying artifacts to a deployment environment. In general, a given manifest may be a data structure that comprises a given set of related artifacts, such as artifacts for a related set of applications/services that collectively form a platform, along with other associated data that may be used for tracking and deploying the set of artifacts.

In practice, the change-control server may create a new version of a manifest on a given branch each time there is an update to the given set of related artifacts contained in that manifest (e.g., an artifact for a new version of an application/service is created), and the change-control server may then maintain both the prior version of the manifest and the new version of the manifest on the given branch. In this respect, the change-control server may also maintain (or be capable of generating) information that reflects the changes between two versions of a manifest. This change information could be included as part of the manifest itself or could be stored separately.

Additionally, the change-control server may also use the manifests to promote artifacts between environments. For instance, a first user that is authorized to access a first branch/deployment environment may request promotion of a given manifest from the first deployment branch/environment to a second branch/deployment environment, which may lead to the manifest being merged into the second branch. The change-control server's use of branches and manifests is described in further detail below.

In general, deployment orchestrator 110 may take the form of one or more computer systems that are configured to cause one or more of the artifacts maintained by change-control server 108 to be deployed to any of deployment environments 102, 104, and 106. For instance, a platform may include one or more servers (or the like) having hardware components and software components that are configured to carry out one or more of the functions disclosed herein, such as obtaining (e.g., downloading) artifacts from the change-control server 108, providing (e.g., uploading) the obtained artifacts to a deployment environment, and causing the deployment environment to begin execution of the provided artifacts, as examples. Deployment orchestrator 110 is discussed in additional detail below.

Client devices 112 and 114 could take the form of computing systems configured to communicate with deployment environments 102, 104, or 106, change-control server 108, and/or deployment orchestrator 110, and to facilitate user interaction with these entities. For example, using a client device, a client-device user may be able to access a software program executing on a given deployment environment, upload and/or download artifacts to or from the change-control server, and/or initiate deployment of one or more artifacts via the deployment orchestrator. To facilitate this interaction, each client device may include hardware components such as a user interface, a network processor, and data store, among other components. Additionally, the client device may be configured with software components that enable interaction with deployment environments 102, 104, or 106, change-control server 108, and/or deployment orchestrator 110. Representative examples of client devices may include a desktop computer, a laptop, a netbook, a tablet, a smartphone, a personal digital assistant (PDA), or any other such device now known or later developed.

In general, communication network 116 may include one or more computing systems and network infrastructure configured to facilitate transferring communications between deployment environments 102, 104, or 106, change-control server 108, deployment orchestrator 110, and/or client devices 112, 114. The communication network may be or may include one or more Wide-Area Networks (WANs) and/or Local-Area Networks (LANs), which may be wired and/or wireless and may support secure communication. In some examples, communication network 116 may include one or more cellular networks and/or the Internet, among other networks. The communication network may operate according to one or more communication protocols, such as LTE, CDMA, GSM, LPWAN, WiFi, Bluetooth, Ethernet, HTTP/S, TCP, CoAP/DTLS and the like. Although communication network 116 is shown as a single network, it should be understood that the communication network may include multiple, distinct networks that are themselves communicatively linked. Further, in example cases, communication network 116 may facilitate secure communications between network components (e.g., via encryption or other security measures). The communication network could take other forms as well.

In an example, the deployment system 100 disclosed herein may be verified for compliance with the traceability requirements of the ISO/IEC 27000-series standards and/or other technical standards.

II. Example Computing System

Figure 2:
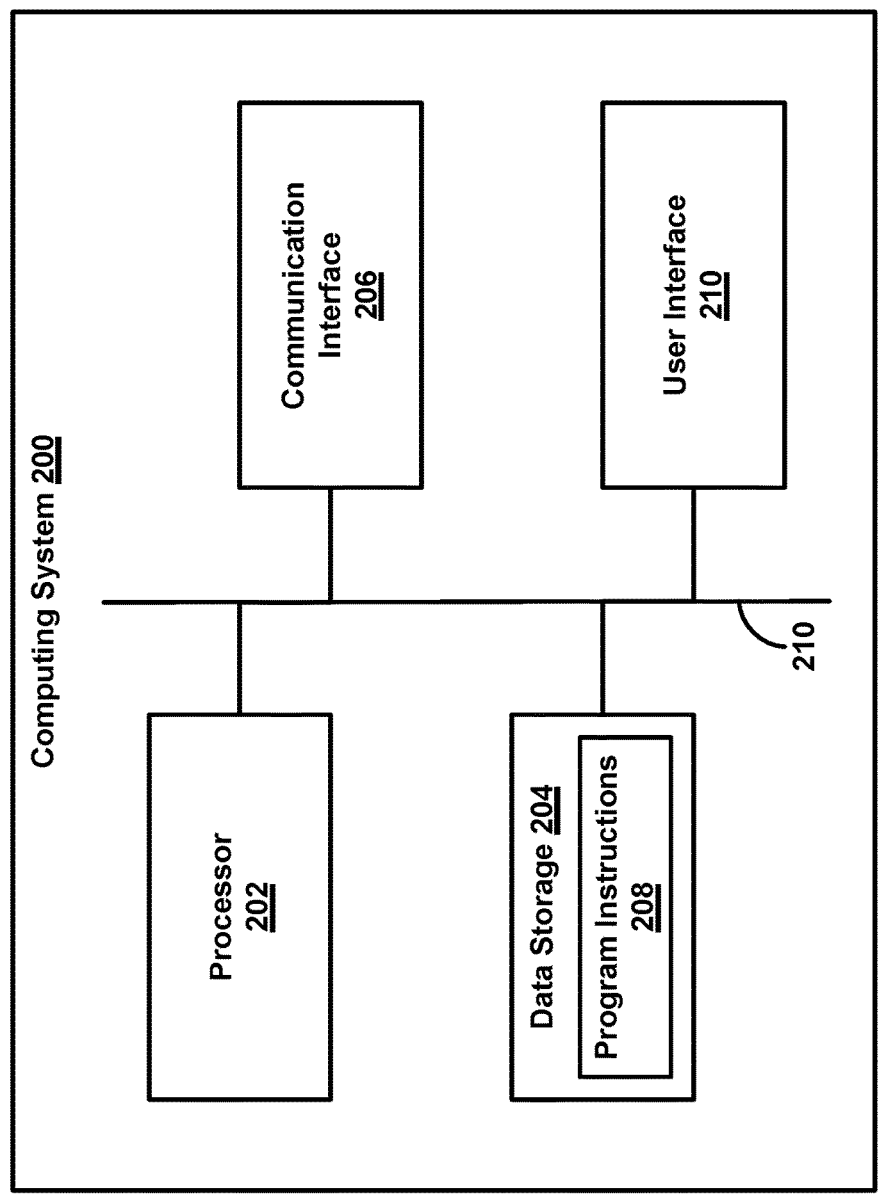
FIG. 2 depicts an example of a computing system.

As noted above, each of the entities shown in FIG. 1 (including deployment environments 102, 104, or 106, change-control server 108, deployment orchestrator 110, client devices 112 or 114) may include and/or take the form of a computer system. FIG. 2 depicts an example of an example computing system, in accordance with one or more embodiments. As shown, a computing system 200 includes a processor 202, a data storage 204, a communication interface 206, and a user interface 210, all of which are communicatively connected by a communication link 208 such as a system bus, network, or other connection mechanism.

Processor 202 may include one or more processors and/or controllers, which may take the form of a general- or special-purpose processor or controller. In particular, in example implementations, processor 202 may include microprocessors, microcontrollers, application-specific integrated circuits, digital signal processors, and the like.

In turn, data storage 204 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

Data storage 204 may be provisioned with software components that enable the computing system 200 to carry out the functions disclosed herein. These software components may generally take the form of program instructions 208 that are executable by processor 202, and may be arranged together into applications, software development kits, toolsets, or the like. In addition, the data storage 204 may also be provisioned with one or more databases that are arranged to store data related to the functions carried out by the computing system, examples of which include time-series databases, document databases, relational databases (e.g., MySQL), key-value databases, and graph databases, among others. The one or more databases may also provide for poly-glot storage.

Communication interface 206 may be configured to facilitate wireless and/or wired communication between the computing system 200 and various network entities (such as the entities shown in FIG. 1) via communication network 116. As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Communication interface 206 may also include multiple network interfaces that support various different types of network connections, some examples of which may include Hadoop, FTP, relational databases, high frequency data such as OSI PI, batch data such as WL, and Base64. Other configurations are possible as well.

Computing system 200 may further include a user interface 210 that is configured to facilitate user interaction with computing system 200 and may also be configured to facilitate causing the computing system to perform an operation in response to user interaction. User interface 210 may include or provide connectivity to various input components, examples of which include touch-sensitive interfaces, mechanical interfaces (e.g., levers, buttons, wheels, dials, keyboards, etc.), and other input interfaces (e.g., microphones). Additionally, user interface 210 may include or provide connectivity to various output components, examples of which may include display screens, speakers, headphone jacks, and the like. Other configurations are possible as well, including the possibility that the user interface 210 is embodied within a client station that is communicatively coupled to the computing system.

Those of skill in the art will appreciate that computing system 200 may contain additional and/or different components. For example, in some embodiment, computing system 200 may include multiple data storages and/or multiple communication interface. In some embodiments, computing system 200 may not include a user interface. Other variations are possible as well.

III. Example Change-Control Server

Figure 3:
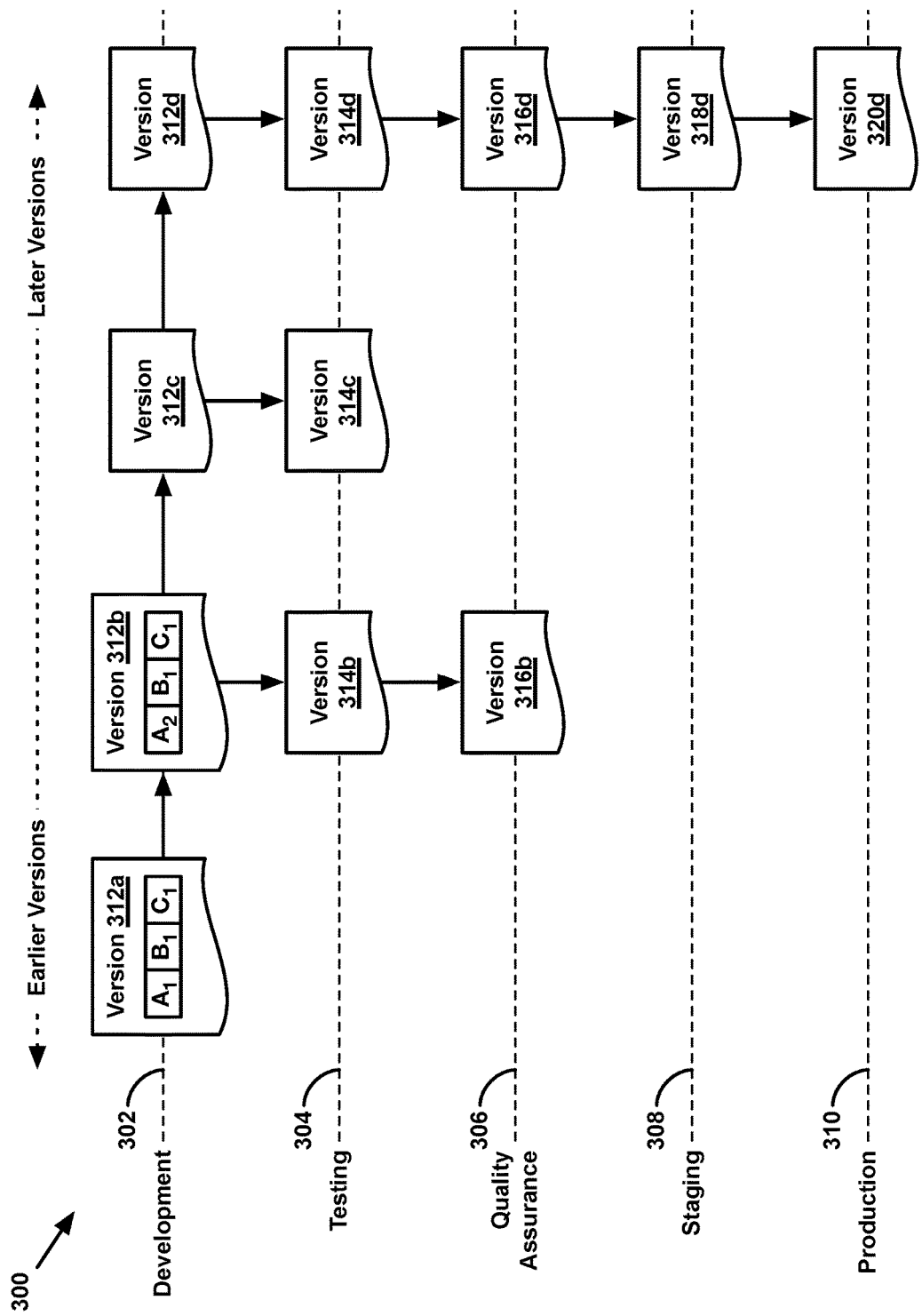
FIG. 3 depicts example branches maintained by a change-control server.

FIG. 3 depicts example branches maintained by a change-control server, in accordance with at least one embodiment. As shown, change-control server maintains a development branch 302, a testing branch 304, a QA branch 306, a staging branch 308, and a production branch 310. On each branch, the change-control server maintains one or more versions of a manifest: specifically, change-control server 108 maintains versions 312$a$, 312$b$, 312$c$, and 312$d$ of a manifest on development branch 302, versions 314$b$, 314$c$, and 314$d$ of a manifest on testing branch 304, versions 316$b$ and 316$d$ of a manifest on QA branch 306, version 318$d$ of a manifest on staging branch 308, and version 320$d$ of a manifest on production branch 310.

Each branch 302-310 maintained by change-control server 108 may correspond to a given deployment environment and may store artifacts for deployment in that given deployment environment. For example, deployment environment 102 may correspond to development branch 302, which in turn may store artifacts for deployment to environment 102. Deployment environment 104 could correspond to testing branch 304, which may store artifacts for deployment to environment 104. Other deployment environments may correspond (respectively) to QA branch 306, staging branch 308, and production branch 310, which may store artifacts for deployment to the respective environments.

Artifacts may be added to, modified, and/or removed from a given branch maintained by change-control server 108. For instance, the change-control server may provide a web interface via which a user of a client device (such as client device 112 or 114) may upload artifacts to a given branch, designate artifacts for deletion in a given branch, etc. The corresponding artifacts for respective software programs may change as development of the software progresses. If a given branch stores an artifact corresponding to a given software program and a user subsequently uploads to that branch a modified artifact corresponding to that program, then the change-control server may store the modified artifact as a new version of the artifact on the given branch (with the already-stored artifact becoming a prior version).

Change-control server 108 may track any changes made to the artifacts of each branch 302-310 (such as the addition, removal, or modification of such artifacts). The branches accordingly serve as timelines of the artifacts deployed (or to be deployed) to the deployment environments corresponding to the respective branches, and thereby reflect the changes over time that have been made to artifacts deployed to the deployment environments corresponding to the respective branches. In other words, the branches of the change-control server 108 may maintain a history of changes for given artifacts, manifests, configurations, etc.

As a result, it may be possible changes to given artifacts, manifests, configurations, etc. to be "rolled back" (i.e., undone) to a prior version. For instance, the change-control server 108 may present a user with an option to revert back to an older version of a given artifact, manifest, configuration, etc. Advantageously, this ability to roll back to prior versions may allow a developer to rapidly reproduce a problem and have an environment for debugging and fixing, and may also allow for quick revert of changes that caused an issue for an end user, which may result in reduced downtime for end users and reduced risk for software providers.

In addition to maintaining branches associated with respective deployment environments, change-control server 108 may manage user access to respective branches (and their corresponding deployment environments). That is, the functions that a given user may carry out (via a client device) with respect to a given branch maintained by the change-control server may depend on whether the user has permission to carry out those functions. Example functions include the ability to make changes to the artifacts on a branch, to request that the artifacts of a given branch be promoted to another branch, and to accept a request to promote artifacts (from another branch) to a given branch. Additional details regarding promotion of artifacts are provided below.

In practice, the change-control server 108 may be based on any version control system now known or later developed, including AccuRev, Git, Subversion, Mercurial, and/or a custom-built version control system, as examples.

As noted above, in accordance with the present disclosure, the change-control server 108 may use a manifest to facilitate the process of tracking changes to artifacts on a given branch. In general, a given manifest may take the form of a data structure that comprises a given set of related artifacts, such as artifacts for a related set of software programs within the platform. The timeline of changes to artifacts stored on a given branch may thus be reflected by respective versions of the manifest on that branch, where each version of the manifest contains the set of artifacts stored on that branch (and thus deployed to the corresponding deployment environment) at a given time. The manifest may include additional information that may be used for tracking and deploying the set of artifacts—information such as metadata for the given set of artifacts (e.g., an identifier for each artifact in the manifest such as a name, version number, etc.), environment data for each deployment environment that facilitates access to the environment (e.g., one or more database Uniform Resource Locators (URLs), Application Programming Interface (API) URLs, usernames, passwords, etc.), and artifact-deployment data for the given set of artifacts that enables an environment to deploy the artifacts (e.g., URLs, API URLs, etc.).

Figure 4:
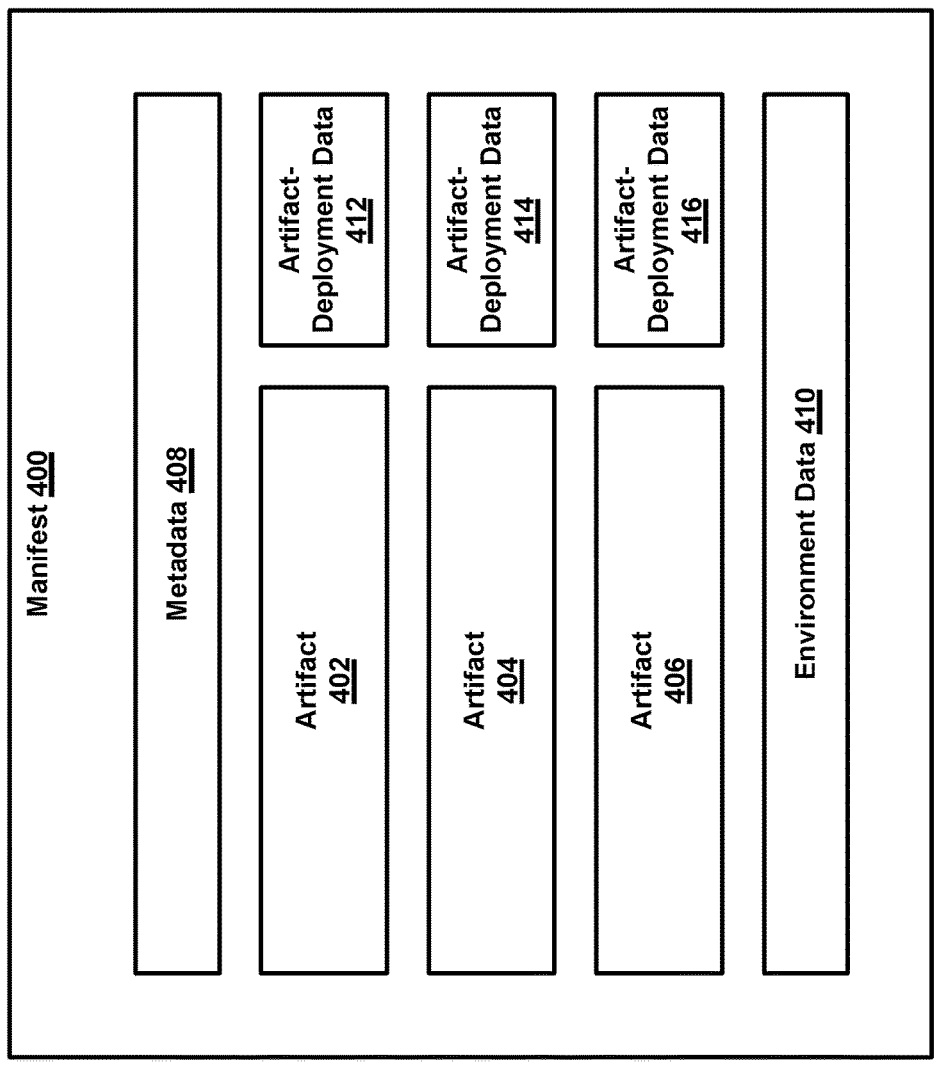
FIG. 4 depicts an example structure of a manifest.

FIG. 4 depicts an example structure of a manifest, in accordance with at least one embodiment. As shown, manifest 400 includes a set of artifacts 402, 404, and 406, metadata 408, environment data 410, and artifact-deployment data 412, 414, and 416. Those of skill in the art will appreciate that manifest 400 may take other forms and may include different and/or additional data.

In general, artifacts 402, 404, and 406 correspond to respective software programs, which in turn collectively form a given platform version. Each version of a manifest can therefore be thought of as a platform version, as each manifest version contains a respectively different set of artifacts (with respect to other manifests). A given manifest version can be promoted from an initial branch (to which the artifacts were originally committed) to a final branch in which the platform version is accessible by end users.

Metadata 408 may generally take the form of data about the manifest and/or the set of artifacts 402, 404, 406. Examples of metadata 408 could include an identifier such as a name, version number, or other identifier of the manifest, a name, version number, or other identifier of each artifact in the manifest, a create and/or last modified date/time associated with the manifest and/or each artifact in the manifest, comments or notes regarding the manifest (such as an indication of new features or outstanding bugs in the included artifacts or a ticket number of an issue tracking system or bugtracker), and/or other data about the manifest and/or the set of artifacts 402, 404, 406.

Environment data 410 may generally take the form of data about deployment environments 102, 104, and 106 that enable the artifacts 402, 404, and 406 to be deployed to a given deployment environment. Examples of environment data 410 for a given environment may include a respective database Uniform Resource Locator (URL), Application Programming Interface (API) URL, Virtual Private Cloud (VPC) identifier, security group definition (e.g., usernames, passwords, etc), and other data about the deployment environment. In implementations where the deployment environments are individually scalable, the environment data 410 for a given deployment environment may also include scaling parameters for the given deployment environment.

Artifact-deployment data 412, 414, and 416 are associated with artifacts 402, 404, and 406, respectively, and generally take the form of data about a given artifact that may be used by a deployment environment to deploy the given artifact. Representative examples of artifact-deployment data for a given artifact may include data that defines the artifact, data regarding scaling for the artifact, and data regarding health checks for the artifact. In addition, artifact-deployment data for a given artifact may include a list of deployment environments to which the given artifact is allowed to be deployed and/or a list of deployment environments to which the given artifact is not allowed to be deployed. In this way, the manifest may provide for confinement of a given artifact to a given environment (or list of environments), which may allow for rapid development without risk of unexpected promotion for new services or risky configurations. Several other advantages may also exist.

The following paragraphs provide an example of how branches maintained by change-control server 108 can be used to track changes to artifacts and to promote artifacts to other branches. It should be understood that the following example is just one way in which the branches may be utilized, as those of skill in the art will understand that other possibilities exist as well.

Initially, a user of client device 112 (or any other client device) commits a set of artifacts $A_1$, $B_1$, and $C_1$ (and perhaps other associated data such as artifact-deployment data) to development branch 302 of change-control server 108. The artifacts may be committed to the change-control server in a number of ways. According to one example, committing the artifacts may involve (for some or all artifacts) the client device sending copies of the artifacts to the change-control server. According to another example, committing the artifacts could involve the client device sending a link to the artifacts which can then be stored in the manifest or which could be used by the change-control server to then obtain copies of the artifacts. In this example, the link could take the form of a uniform resource locator (URL), uniform resource identifier (URI), or other artifact identifier. According to yet another example, committing the artifacts could involve the client device sending a pre-generated manifest that includes some or all of the artifacts, or it could involve the client device sending individual components of the manifest (such as individual artifacts and/or accompanying artifact-deployment data) to the change-control server.

Change-control server 108 then determines whether the user that committed the artifacts to development branch 302 has permission to make changes to the that branch. The change-control server may make this determination by accessing an access control list (ACL) list stored on the change-control server, the deployment environment that corresponds to that branch, or another entity (as examples). In this example, change-control server 108 determines that the user has permission to make changes to development branch 302 and accordingly proceeds to save the committed artifacts to the development branch.

Initially, development branch 302 contains no artifacts or manifests. If the change-control server has not previously saved a manifest containing artifacts to a given branch, then the change-control server may create and save a new manifest for the branch that contains the committed artifacts $A_1$, $B_1$, and $C_1$. If the change-control server has previously saved a manifest to a given branch, then the change-control server may create and save a new version of the previously-saved manifest. The previously-saved manifest is treated as an "initial" version of the manifest. Each version of the manifest (except for the initial version) may have an immediately preceding version, and the version of the manifest that has no succeeding version may be considered the latest or most-recent version of the manifest.

If change-control server 108 has not previously saved a manifest to development branch 302, the change-control server may create a new manifest for the branch that contains the committed artifacts. Such a new manifest is depicted in FIG. 3 as an "initial" version 312a of the manifest. If change-control 108 receives the committed artifacts in the form of a manifest generated by client device 112, then the change-control server may create the new manifest by copying the contents of the received manifest to the new manifest. If the change-control server receives only artifacts (and not a manifest) from the client device, then the change-control server could create the new manifest by generating a manifest that contains the receives artifacts. Other variations are possible as well.

As will be described in further detail below, deployment orchestrator 110 may monitor the branches maintained by change-control server 108 and may update the corresponding deployment environments by causing any new or modified artifacts to be deployed. In this example, development branch 302 corresponds with deployment environment 102. Deployment orchestrator 110 detects that artifacts have been added to development branch 302 (as indicated by the new manifest version 312a) and accordingly causes the artifacts to be deployed to environment 102. A user with permission to access deployment environment 102 may then interact (via a client device) with the respective software program to which the artifacts correspond.

A user associated with the development branch 302 may subsequently interact with the software programs corresponding those artifacts (as deployed to environment 102). During that interaction, a user may determine that a given artifact should be updated and then decide to commit an updated version of the artifact to development branch 302. For example, the user may determine that the software program corresponding to artifact $A_1$ is exhibiting undesired behavior such as program errors and then decide to commit an updated artifact $A_2$ to development branch 302. In response, the change-control server may again determine that the user has permission to make changes to the branch and create a new version of the manifest for the branch that includes the updated version of the given artifact and unmodified versions of the other artifacts in the manifest. Such a newly-created version of the manifest is shown as version 312b in FIG. 3. Deployment orchestrator 110 may then detect that artifacts in development branch 302 have been changed (as indicated by new manifest version 312b) and responsively cause the newly-committed version of the artifact to be deployed to environment 102.

A user may also request that a given version of a manifest in a given branch be promoted to a different branch. That is, if the user has permission to request promotion of manifests in the given branch, then the user may request that the change-control server save a given version of a manifest in the given branch as the latest version of the manifest in a different branch. Additionally, a user may be able accept requests to promote manifests to a given branch if the user has permission to accept requests to promote manifests to that branch.

In this example, a user associated with the development branch 302 may interact with the software programs corresponding to the artifacts deployed to environment 102 (i.e., the artifacts in manifest version 312b) and may determine that the operation of the software programs is satisfactory enough to promote the artifacts to the next deployment phase. To the extent the user has permission to request promotion of manifests (including manifest version 312b) in development branch 302, the user may then request promotion of manifest version 312b from development branch 302 to another branch maintained by change-control server 108.

Typically (but not always), a version of a manifest in a given branch is promoted to a branch associated with the next phase of the development process with respect to the phase associated with the given branch. For example, because the testing phase immediately follows the development phase, manifest version 312b in development branch 302 would typically be promoted to testing branch 304, a manifest version in the testing branch would be promoted to QA branch 306, and so forth. However, it may also be possible to promote a manifest version in development branch 302 to a branch other than branch 304. For example, a manifest version in development branch 302 could be promoted to production branch 310. Promoting a manifest version in a given branch could even involve (though not typically) "promoting" the manifest version to a branch associated with a prior phase of the development process (with respect to the phase associated with the given branch). For example, a manifest version in staging branch 308 could be promoted to quality assurance branch 306.

The promotion request received by the change-control server may specify that a manifest version be promoted to an explicitly identified branch. To illustrate, an example request could specify that manifest version 312d in development branch 302 should be promoted to "testing branch 304." Alternatively, the promotion request may specify that a manifest version in a given branch should be promoted to a branch associated with the next phase of the deployment process with respect to the given branch. For example, a request could specify that manifest version 312d should be promoted to a "next branch" (which in this case would be testing branch 304 associated with the testing phase).

In this example, the request to promote manifest version 312b specifies that the manifest version should be promoted to testing branch 304. Another user that has permission to accept requests to promote manifests to testing branch 304 may then consider and accept the request. In this example, testing branch 304 initially contains no manifest, so upon this user accepting the request, the change-control server may copy manifest version 312b in development branch 302 to a new manifest in the testing branch.

In some examples, promotion of a given artifact in a manifest may be restricted to a subset of the branches maintained by change-control server 108. Such promotion could be restricted if, for example, a given artifact is still undergoing active development or is otherwise not yet ready for deployment to production branch 110 or other branch (or branches) maintained by the change-control server. A promotion restriction could be specified by identifying the branches to which a given artifact may be promoted and/or by identifying the branches to which the artifact may not be promoted, as examples. The promotion restriction could be specified in the manifest (e.g., within the artifact-deployment data associated with the given artifact), or could be specified by other means.

To illustrate, artifact $A_2$ in manifest version 312b may be restricted to promotion to testing branch 304 or quality assurance branch 306. If a manifest version containing artifact $A_2$ is promoted to staging branch 308 or production branch 310, then deployment orchestrator 110 may skip deployment of artifact $A_2$ to the environment corresponding to the respective branch, and may instead deploy only those artifacts that are not restricted from deployment to the corresponding environment (i.e., artifacts $B_1$ and $C_1$). As another possibility, change-control server 108 may deny any request to promote a manifest version containing artifact $A_2$ to a branch to which the artifact is restricted from deployment. Other means of restricting promotion of artifacts are possible as well.

In addition to requesting promotion of a given manifest version on a given branch, a user may request that change-control server 108 revert a manifest on the given branch to a previous version. For example, if the current version of the manifest on development branch 302 is version 312c or 312d, then the user may request that the change-control revert the manifest to version 312a or 312b. By reverting the manifest to a prior version, a software developer may be able to rapidly reproduce, in a deployment environment associated with development branch 302, the functionality of the artifacts in that prior manifest version.

The process of committing artifacts and promoting manifests may continue until a given manifest is promoted to a branch associated with a final phase of the development process—in this example, the production branch 110. For example, a user may commit an updated set of artifacts to development branch 302 and change-control server 108 may create a new manifest version 312c that reflects the changes to the artifacts in that branch. A user may request that manifest version 312c be promoted to testing branch 304, and upon the request being accepted, the change-control server may copy manifest version 312c to the testing branch as a new version 314c of the manifest previously created in the testing branch by change-control server 108. A manifest promoted to production branch 310 becomes a new release of the platform.

IV. Example Deployment Orchestrator

As explained above, deployment orchestrator 110 may generally function to update a deployment environment to reflect changes made to a given branch maintained by change-control server 108. For example, if a new version of an artifact (i.e., a modified artifact corresponding to a given software program) is added to the branch, then the deployment orchestrator may cause the new version of the artifact to be deployed and may also cause the deployment environment to undeploy (e.g., stop execution) of any previous version of that artifact. The deployment orchestrator may interact with both the change-control server and the deployment environment to ensure that the deployment environment is updated to reflect changes made to the given branch.

Figure 5:
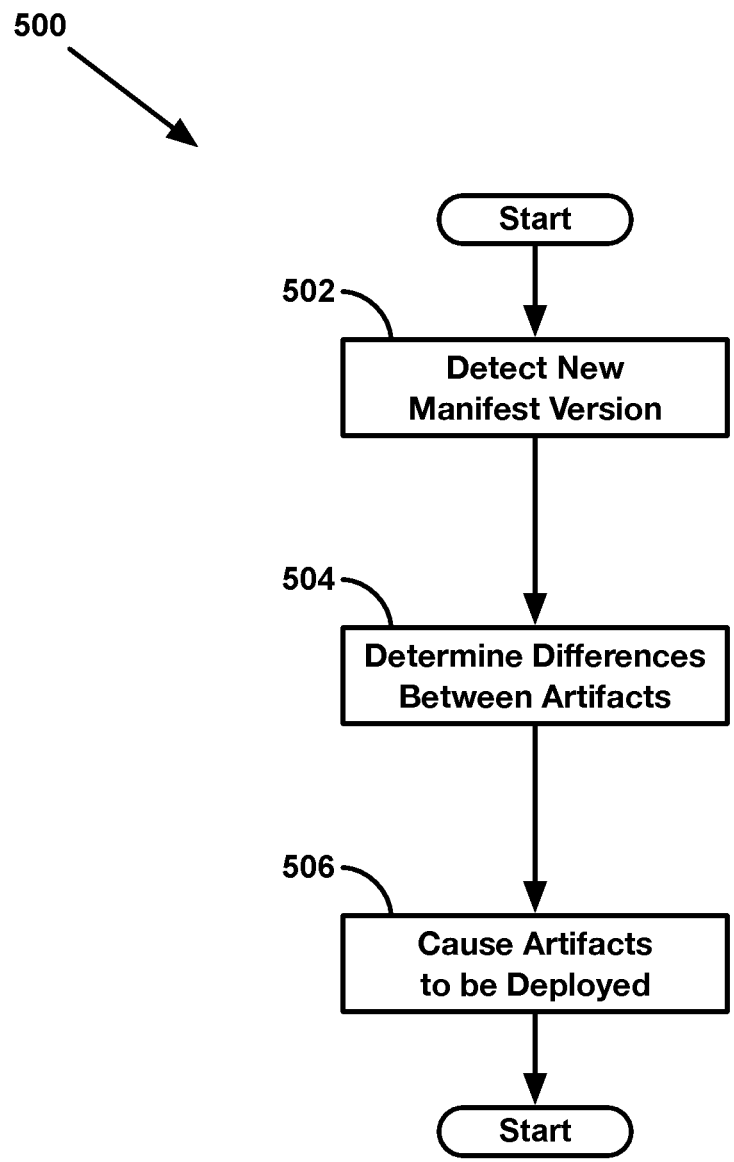
FIG. 5 depicts a flowchart of an example method carried out by a deployment orchestrator.

FIG. 5 depicts a flowchart of an example method carried out by a deployment orchestrator, in accordance with at least one embodiment. As shown, a method 500 begins at step 502 with deployment orchestrator 110 monitoring the branches of the change-control server 108 for changes to the manifests. This monitoring function may take various forms.

According to one implementation, the deployment orchestrator may check the change-control server for manifest changes in response to the occurrence of a given detection trigger, which may take various forms. For example, the detection trigger could be the passage of a given amount of time (e.g., a given number of hours, minutes, or seconds) since the last occurrence of a prior detection trigger. As another example, the detection trigger could occur at one or more scheduled times of day. As yet another example, the detection trigger could take the form of a push notification from the change-control server. For instance, the change-control server may obtain, from the deployment orchestrator, an identification of the manifest version containing artifacts deployed to the given deployment by the deployment orchestrator. In response to obtaining the identification of the manifest version from the deployment orchestrator, the change-control server may determine that the most-recent version of a manifest on the change-control server is different from the version of the manifest containing the artifacts deployed to the given deployment environment. The change-control server may then send a push notification to the deployment orchestrator indicating the presence of a new version of the manifest on the change-control server. The detection trigger may take other forms as well.

Monitoring the branches for changes may involve deployment orchestrator 110 determining the differences between (i) the artifacts contained in the most-recent versions of the manifests and (ii) the artifacts deployed to deployment environments corresponding to the given branches. Additional details regarding the comparison of artifacts are provided below with reference to step 504.

As another possibility, monitoring the branches for changes may involve deployment orchestrator 110 comparing (i) an identifier of the most-recent version of the manifest on the given branch with (ii) an identifier of the manifest that is currently deployed at the given deployment environment that corresponds to the given branch. For example, the deployment orchestrator may request an identification of the most-recent version of the manifest on the given branch from the change-control server, or may request a changelog of the manifest on the given branch from the change-control server and may obtain the identifier from a changelog received from the change-control server in response to the request. The deployment orchestrator 110 may further request the identifier of the manifest that is currently deployed at the deployment environment corresponding to the given branch, or may retrieve an identifier of a manifest stored by the deployment orchestrator when causing the manifest to be deployed to the given deployment environment. The deployment orchestrator may then check for changes to the manifests by comparing the obtained identifier (e.g., by checking whether the identifiers are different from each other).

At step 504, the deployment orchestrator 110 may determine the differences between (i) the artifacts contained in the changed manifests and (ii) the artifacts deployed to deployment environments corresponding to the given branches containing the changed manifest. The deployment orchestrator may perform this function in various manners.

Determining the differences between the artifacts may involve deployment orchestrator 110 obtaining identifiers of the artifacts contained in the changed manifests and identifiers of the artifacts deployed to deployment environments. The deployment orchestrator may the check for such differences by comparing the obtained artifact identifiers (e.g., by checking whether the identifiers are different from each other).

Deployment orchestrator 110 may identify the artifacts contained in the new version of the manifest by obtaining an identification of the artifacts from the new manifest version itself, which may involve obtaining the manifest version from change-control server 108 and determining the identification of the artifacts in the obtained manifest version. The identities of the artifacts could be obtained from metadata included in the manifest, from artifact-deployment data associated with the respective artifacts, and/or from the artifacts themselves, among other possibilities.

As another possibility, deployment orchestrator 110 may identify the artifacts contained in the new version of the manifest by requesting an identification of the artifacts from change-control server 108. For example, the deployment orchestrator may request an "identification of artifacts in the most-recent version" of the manifest from the change-control server. The change-control server, in response to receiving the request from the deployment orchestrator, may identify the most-recent version of the manifest stored on the change-control server and may send a response to the deployment orchestrator that includes the request identification of artifacts contained in the manifest version identified as being the most recent by the change-control server. As another example, deployment orchestrator 110 may use the identifier of the most-recent version of the manifest (which may be obtained as described above with respect to step 502) to request an identification of the artifacts from change-control server 108. For instance, the deployment orchestrator may request an "identification of artifacts in version x" of the manifest from the change-control server, where x is the obtained manifest version. In response to receiving the request, the change-control server may send a response to the deployment orchestrator that includes the request identification of artifacts.

Deployment orchestrator 110 may identify the artifacts deployed to the deployment environments corresponding respective branches by requesting an identification of the deployed artifacts from the deployment environment. In an example, the deployment orchestrator has previously caused artifacts from a prior manifest version to be deployed to the given deployment environment, and additionally provided the deployment environment with an identification of those artifacts. Subsequently, the deployment orchestrator requests an identification from the deployment environment of the artifacts deployed to that deployment environment. The deployment orchestrator subsequently receives a response that includes the requested identification of the deployed artifacts, and the deployment orchestrator determines the differences between the respective sets of artifacts based (at least in part) on the received identification of artifacts.

As another possibility, deployment orchestrator 110 may identify the artifacts deployed to the deployment environments corresponding respective branches by obtaining an identification of the artifacts deployed to the deployment environment from a data storage. In an example, the deployment orchestrator has previously caused artifacts from a prior manifest version to be deployed to the given deployment environment, and additionally stored an identification of those artifacts in a data storage. Subsequently, the deployment orchestrator detects a new version of a manifest on the change-control server and, as part of the determination of the differences between the artifacts contained in the new manifest version and the artifacts deployed to given deployment environment, the deployment orchestrator obtains the stored identification of artifacts deployed to the deployment environment. The deployment orchestrator then determines the differences between the respective sets of artifacts based (at least in part) on the identification of artifacts obtained from the data storage.

At step 506, after determining the differences between the respective sets of artifacts, the deployment orchestrator causes one or more artifacts to be deployed to a given deployment environment based on the determined differences. The deployment orchestrator may perform this function in various manners.

As an example, deployment orchestrator 110 may obtain the one or more artifacts to be deployed and may provide the obtained artifacts to the given deployment environment. The artifacts could be obtained individually from change-control server 108, an artifact repository such as a binary repository manager, and/or another deployment environment, as examples. As another possibility, the deployment orchestrator may obtain the artifacts from the version of the manifest containing the artifacts to be deployed. The deployment orchestrator may provide the obtained artifacts by saving the artifacts to a data storage or file system of the given deployment environment or by sending the artifacts to the deployment environment via network 116, among other possibilities.

As another example, deployment orchestrator 110 may cause the given deployment environment to obtain the artifacts to be deployed, e.g., by sending links to the artifacts stored on another entity such as change-control server 108, an artifact repository, another deployment environment, and/or a cloud storage, among other possibilities. The deployment environment may then obtain the artifacts using the received links.

As still another example, deployment orchestrator 110 may cause another entity to send the artifacts to the given deployment environment. The other entity could be change-control server 108, an artifact repository, a deployment environment, a cloud storage, any other entity, or any combination of these, among other possibilities. To cause the entity to send the artifacts, the deployment orchestrator may provide the entity with links to the artifacts and with a link to the deployment environment at which the artifacts are to be deployed.

In practice, the artifacts to be deployed may be provided to the deployment environment using a file-transfer protocol such as file transfer protocol (FTP), secure shell (SSH) file transfer protocol (SFTP), rsync, hypertext transfer protocol (HTTP), secure http (HTTPS), server message block (SMB), common internet file system (CIFS), and/or Apple filing protocol (AFP), among numerous other possibilities.

Deployment orchestrator 110 may cause the one or more artifacts to be deployed to the given deployment environment by causing the deployment environment to begin execution of the artifacts. The deployment orchestrator may cause the deployment environment to begin execution by providing the artifacts to the deployment environment as described above, which in turn may detect that the artifacts have been provided and responsively begin execution of the artifacts. As another possibility, the deployment orchestrator may send an instruction to the deployment environment to begin execution of the artifacts (e.g., the artifacts obtained by the deployment environment).

The deployment orchestrator may also use additional data contained in the manifest to facilitate the process of causing the artifacts to be deployed to the given deployment environment. For instance, the deployment orchestrator 110 may use environment data contained in the manifest to facilitate the process of causing the artifacts to be deployed. For example, once the deployment orchestrator 110 has identified the given deployment environment to which artifacts are to be deployed, the deployment orchestrator 110 may cause certain types of environment data for the given deployment environment to be used by the artifacts (e.g., one or more database URLs, APIs, etc.). As another example, if the environment data includes scaling parameters for the given deployment environment, the deployment orchestrator 110 may cause the given deployment environment to automatically scale in accordance with the scaling parameters. (It should be understood that a given deployment environment may scale in response to other triggering events as well, such as promotion of a new manifest to the branch corresponding to the given deployment environment). Other examples are possible as well.

Additionally, the deployment orchestrator 110 may use artifact-deployment data contained in the manifest to facilitate the process of causing the artifacts to be deployed. For example, the deployment orchestrator 110 may cause the given deployment environment to use certain types of artifact-deployment data during the execution of the artifacts. As another example, if the artifact-deployment data includes lists of deployment environments to which the artifacts may and may not be deployed, the deployment orchestrator may rely on this artifact-deployment data to determine which artifacts to deploy to the given deployment environment. Other examples are possible as well.

In practice, the deployment orchestrator 110 could provide such additional data to the deployment environment (which may then configure the deployment environment or the respective artifacts based on the provided data) or may itself configure the deployment environment and/or respective artifacts based on the additional data.

Users with access to the respective deployment environments may interact with deployment environments after deployment orchestrator 110 has caused the artifacts to be deployed. As mentioned previously, developers and other test users may test the functionality of the software programs corresponding to the deployed artifacts. If the operation of the software is found faulty, then the artifacts on the branch corresponding to the deployment environment may be updated by a user having access to modify the branch. If the operation is found to be satisfactory, then the user may request promotion of the artifacts to the next branch/deployment environment. This process may continue until the artifacts have been promoted and deployed to a production environment as a new release of a platform.

V. Example Platform

As discussed previously, a given platform can take the form of one or more artifacts corresponding to respective software programs that collectively provide a set of related applications or services. Change-control server 108, deployment orchestrator 110, and deployment environments 102, 104, and 106 can be used to deploy various platforms, including an asset-data platform that is used to receive data related to asset operation, ingest, process, and analyze the received data, and then facilitate providing one or more tools that enable a user to monitor asset operation and take action based on that asset operation. The asset-data platform may obtain asset-related data from various sources, such as an asset, another asset data platform, and/or some other third party data source, and may process and/or maintain obtained data in various manners.

Figure 6:
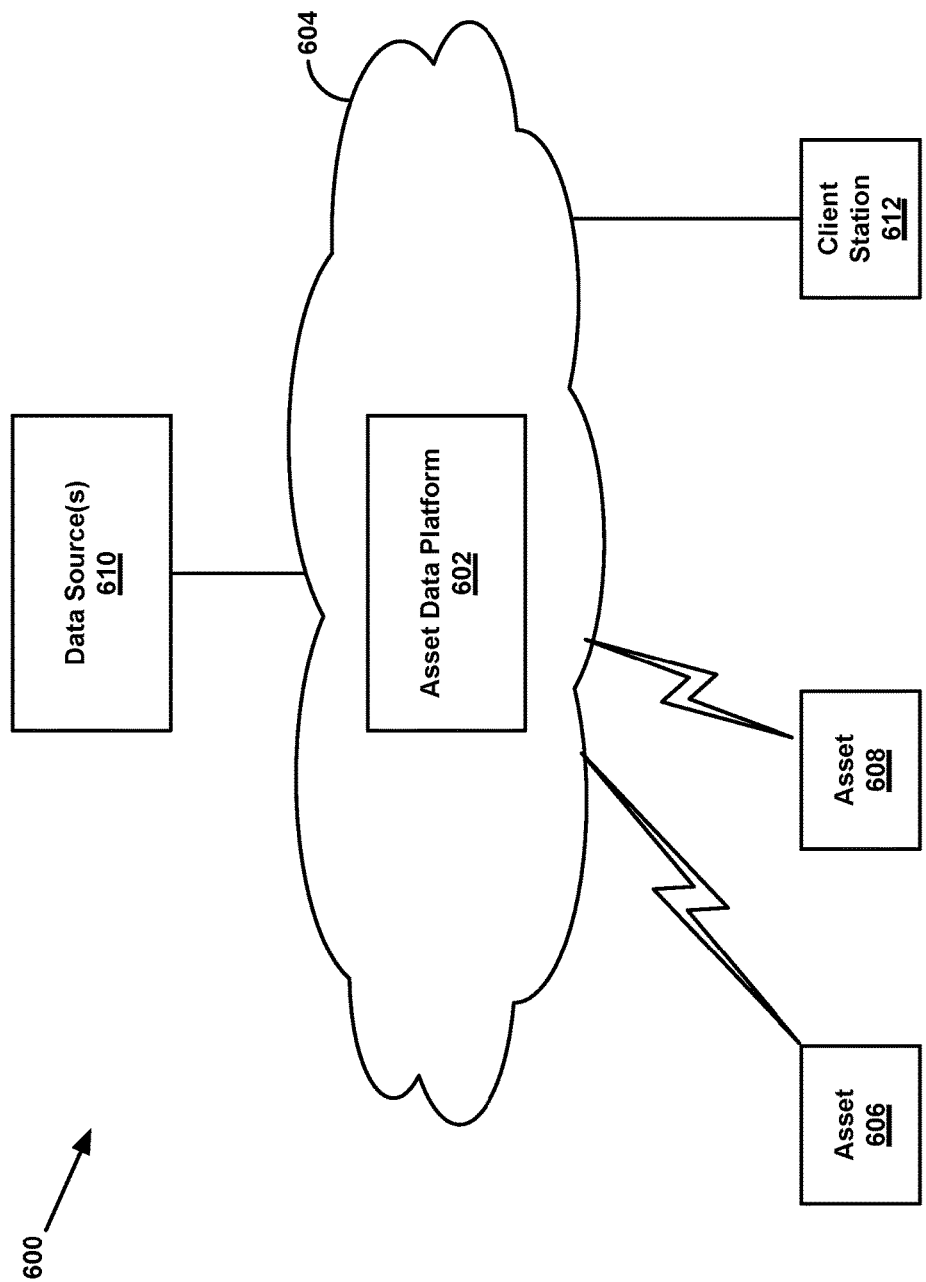
FIG. 6 depicts an example network configuration.

FIG. 6 depicts an example network configuration 600 in which an example platform may be implemented. As shown, the network configuration 600 includes at its core a remote computing system 602 that may be configured as an asset data platform, which may communicate via a communication network 604 with one or more assets, such as representative assets 606 and 608, one or more data sources, such as representative data source 610, and one or more output systems, such as representative client station 612. It should be understood that the network configuration may include various other systems as well.

Broadly speaking, the asset data platform 602 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 602 is discussed in further detail below with reference to FIG. 4.

As shown in FIG. 6, the asset data platform 602 may be configured to communicate, via the communication network 604, with the one or more assets, data sources, and/or output systems in the network configuration 600. For example, the asset data platform 602 may receive asset-related data, via the communication network 604, that is sent by one or more assets and/or data sources. As another example, the asset data platform 602 may transmit asset-related data and/or commands, via the communication network 604, for receipt by an output system, such as a client station, a work-order system, a parts-ordering system, etc. The asset data platform 602 may engage in other types of communication via the communication network 604 as well.

In general, the communication network 604 may include one or more computing systems and network infrastructure configured to facilitate transferring data between asset data platform 602 and the one or more assets, data sources, and/or output systems in the network configuration 600. The communication network 604 may be or may include one or more Wide-Area Networks (WANs) and/or Local-Area Networks (LANs), which may be wired and/or wireless and may support secure communication. In some examples, the communication network 604 may include one or more cellular networks and/or the Internet, among other networks. The communication network 604 may operate according to one or more communication protocols, such as LTE, CDMA, GSM, LPWAN, WiFi, Bluetooth, Ethernet, HTTP/S, TCP, CoAP/DTLS and the like. Although the communication network 604 is shown as a single network, it should be understood that the communication network 604 may include multiple, distinct networks that are themselves communicatively linked. Further, in example cases, the communication network 604 may facilitate secure communications between network components (e.g., via encryption or other security measures). The communication network 604 could take other forms as well.

Further, although not shown, the communication path between the asset data platform 602 and the one or more assets, data sources, and/or output systems may include one or more intermediate systems. For example, the one or more assets and/or data sources may send asset-related data to one or more intermediary systems, such as an asset gateway or an organization's existing platform (not shown), and the asset data platform 602 may then be configured to receive the asset-related data from the one or more intermediary systems. As another example, the asset data platform 602 may communicate with an output system via one or more intermediary systems, such as a host server (not shown). Many other configurations are also possible.

In general, the assets 606 and 608 may take the form of any device configured to perform one or more operations (which may be defined based on the field) and may also include equipment configured to transmit data indicative of the operation of the given asset (i.e., operating conditions). This data may take various forms, examples of which may include operating data, such as sensor/actuator data (e.g., signal data) and/or abnormal-condition indicators (e.g., fault codes), identifying data for the asset, location data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different configurations (e.g., brand, make, model, firmware version, etc.).

As such, in some examples, the assets 606 and 608 may each be of the same type (e.g., a fleet of locomotives or aircrafts, a group of wind turbines, a pool of milling machines, or a set of magnetic resonance imagining (MM) machines, among other examples) and perhaps may have the same configuration (e.g., the same brand, make, model, firmware version, etc.). In other examples, the assets 606 and 608 may have different asset types or different configurations (e.g., different brands, makes, models, and/or firmware versions). For instance, assets 606 and 608 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 610 may be or include one or more computing systems configured to collect, store, and/or provide data that is related to the assets or is otherwise relevant to the functions performed by the asset data platform 602. For example, the data source 610 may collect and provide operating data that originates from the assets (e.g., historical operating data), in which case the data source 610 may serve as an alternative source for such asset operating data. As another example, the data source 610 may be configured to provide data that does not originate from the assets, which may be referred to herein as "external data." Such a data source may take various forms.

In one implementation, the data source 610 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 610 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 610 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 602 may receive data from the data source 610 by "subscribing" to a service provided by the data source. However, the asset data platform 602 may receive data from the data source 610 in other manners as well.

The client station 612 may take the form of a computing system or device configured to access and enable a user to interact with the asset data platform 602. To facilitate this, the client station may include hardware components such as a user interface, a network interface, a processor, and data storage, among other components. Additionally, the client station may be configured with software components that enable interaction with the asset data platform 602, such as a web browser that is capable of accessing a web application provided by the asset data platform 602 or a native client application associated with the asset data platform 602, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 600 is one example of a network in which embodiments described herein may be implemented. Numerous other arrangements are possible and contemplated herein. For instance, other network configurations may include additional components not pictured and/or more or less of the pictured components.

The invention claimed is:

1. A computer system comprising:
   a network interface configured to facilitate communications over a communication network with (i) at least two different types of deployment environments and (ii) a change-control server comprising a plurality of branches for storing manifests, wherein the plurality of branches includes at least one branch that corresponds to each of the at least two different types of deployment environments;

at least one processor;

a non-transitory computer-readable medium; and program instructions stored on the non-transitory computer-readable medium that are executable by the at least one processor to cause the computing system to perform the following functions for each of the plurality of branches of the change-control server:

monitor a respective branch of the change-control server for an updated version of a given manifest stored on the respective branch, wherein the respective branch corresponds to a respective type of deployment environment;

while monitoring the respective branch, detect an updated version of the given manifest stored on the respective branch, wherein the updated version of the given manifest contains a first set of artifacts;

identify at least one artifact that differs between (i) the first set of artifacts contained in the updated version of the given manifest and (ii) a second set of artifacts being deployed at the respective type of deployment environment; and in response to identifying the at least one artifact that differs between the first and second sets of artifacts, cause the identified at least one artifact to be deployed to the respective type of deployment environment.

2. The computer system of claim 1, wherein the program instructions that are executable to cause the computing system to identify the at least one artifact that differs between the first and second sets of artifacts comprise program instructions stored on the non-transitory computer-readable medium that are executable by the at least one processor to cause the computing system to identify at least one artifact that is in the first set but not in the second set.

3. The computer system of claim 1, wherein the program instructions that are executable to cause the computing system to identify the at least one artifact that differs between the first and second sets of artifacts comprise program instructions stored on the non-transitory computer-readable medium that are executable by the at least one processor to cause the computing system to identify at least one artifact that is in the second set but not in the first set, and wherein the computer system further comprises program instructions stored on the non-transitory computer-readable medium that are executable by the at least one processor to cause the computing system to cause the identified at least one artifact to be undeployed from the respective type of deployment environment.

4. The computer system of claim 1, wherein the program instructions that are executable to cause the computing system to cause the identified at least one artifact to be deployed to the respective type of deployment environment comprise program instructions stored on the non-transitory computer-readable medium that are executable by the at least one processor to cause the computing system to provide the identified at least one artifact to the respective type of deployment environment.

5. The computer system of claim 4, wherein the program instructions that are executable to cause the computing system to provide the identified at least one artifact to the respective type of deployment environment comprise program instructions stored on the non-transitory computer-readable medium that are executable by the at least one processor to cause the computing system to obtain the identified at least one artifact from the change-control server and provide the obtained at least one artifact to the respective type of deployment environment.

6. The computer system of claim 1, wherein the program instructions that are executable to cause the computing system to cause the identified at least one artifact to be deployed to the respective type of deployment environment comprise program instructions stored on the non-transitory computer-readable medium that are executable by the at least one processor to cause the computing system to cause the respective type of deployment environment to begin execution of the identified at least one artifact.

7. The computer system of claim 1, wherein each artifact in the first set of artifacts contained in the updated version of the given manifest is executable without any additional compilation.

8. The computer system of claim 1, wherein each of the plurality of branches of the change-control server is associated with a respective phase of a software deployment process.

9. The computer system of claim 8, wherein each of the at least two different types of deployment environments corresponds to a respective phase of the software deployment process.

10. The computer system of claim 1, wherein the updated version of the given manifest further comprises environment data for at least the respective type of deployment environment, and wherein the program instructions that are executable to cause the computing system to cause the identified at least one artifact to be deployed to the respective type of deployment environment comprise program instructions stored on the non-transitory computer-readable medium that are executable by the at least one processor to cause the computing system to:

cause the identified at least one artifact to use the environment data for the respective type of deployment data.

11. The computer system of claim 10, wherein the environment data comprises at least one of: a database Uniform Resource Locator (URL), an Application Programming Interface (API) URL, a Virtual Private Cloud (VPC) identifier, and a security group definition.

12. The computer system of claim 1, wherein the updated version of the given manifest further comprises artifact-deployment data for the identified at least one artifact, and wherein the program instructions that are executable to cause the computing system to cause the identified at least one artifact to be deployed to the respective type of deployment environment comprise program instructions stored on the non-transitory computer-readable medium that are executable by the at least one processor to cause the computing system to:

cause the respective type of deployment environment to use the artifact-deployment data to deploy the identified at least one artifact.

13. The computer system of claim 12, wherein the artifact-deployment data comprises at least one of: data that defines the identified at least one artifact, data regarding scaling for the identified at least one artifact, and data regarding health checks for the identified at least one artifact.

14. The computer system of claim 1, wherein there are multiple versions of the given manifest stored on the respective branch, and wherein the updated version of the given manifest comprises a most-recent version of the given manifest stored on the respective branch.

15. The computer system of claim 14, wherein first set of artifacts contained in the most-recent version of the given manifest is different from a third set of artifacts contained in a prior version of the given manifest.

16. The computer system of claim 1, wherein the program instructions that are executable to cause the computing system to monitor the respective branch of the change-control server for an updated version of the given manifest comprise program instructions stored on the non-transitory computer-readable medium that are executable by the at least one processor to cause the computing system to periodically query the change-control server for an updated version of the given manifest.

17. The computer system of claim 1, wherein the program instructions that are executable to cause the computing system to monitor the respective branch of the change-control server for an updated version of the given manifest comprise program instructions stored on the non-transitory computer-readable medium that are executable by the at least one processor to cause the computing system to query the change-control server for an updated version of the given manifest in response to receiving a query request from a client device.

18. The computer system of claim 1, wherein the first set of artifacts contained in the updated version of the given manifest comprise Docker containers, Java ARchive (JAR) files, Web application ARchive (WAR) files, Apache Spark executables, or Chef scripts.

19. A computer-implemented method for orchestrating the deployment of artifacts to at least two different types of deployment environments based on a change-control server comprising a plurality of branches for storing manifests, wherein the plurality of branches includes at least one branch that corresponds to each of the at least two different types of deployment environments, the method comprising the following functions for each of the plurality of branches of the change-control server:

monitoring a respective branch of the change-control server for an updated version of a given manifest stored on the respective branch, wherein the respective branch corresponds to a respective type of deployment environment;

while monitoring the respective branch, detecting an updated version of the given manifest stored on the respective branch, wherein the updated version of the given manifest contains a first set of artifacts;

identifying at least one artifact that differs between (i) the first set of artifacts contained in the updated version of the given manifest and (ii) a second set of artifacts being deployed at the respective type of deployment environment; and in response to identifying the at least one artifact that differs between the first and second sets of artifacts, causing the identified at least one artifact to be deployed to the respective type of deployment environment.

20. A non-transitory computer-readable medium having program instructions stored thereon that are executable to cause a computing device to orchestrate the deployment of artifacts to at least two different types of deployment environments based on a change-control server comprising a plurality of branches for storing manifests, wherein the plurality of branches includes at least one branch that corresponds to each of the at least two different types of deployment environments by performing the following functions for each of the plurality of branches of the change-control server:

monitor a respective branch of the change-control server for an updated version of a given manifest stored on the respective branch, wherein the respective branch corresponds to a respective type of deployment environment;

while monitoring the respective branch, detect an updated version of the given manifest stored on the respective branch, wherein the updated version of the given manifest contains a first set of artifacts;

identifying at least one artifact that differs between (i) the first set of artifacts contained in the updated version of the given manifest and (ii) a second set of artifacts being deployed at the respective type of deployment environment; and in response to identifying the at least one artifact that differs between the first and second sets of artifacts, cause the identified at least one artifact to be deployed to the respective type of deployment environment.

* * * * *